Jan. 3, 1967 A. J. MULLIKIN 3,295,245
FISHHOOK GUARD AND LEADER ALIGNING DEVICE
Filed Feb. 19, 1965
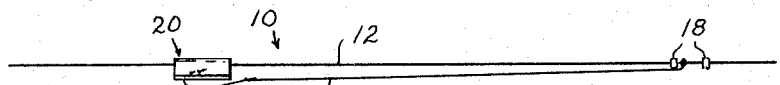
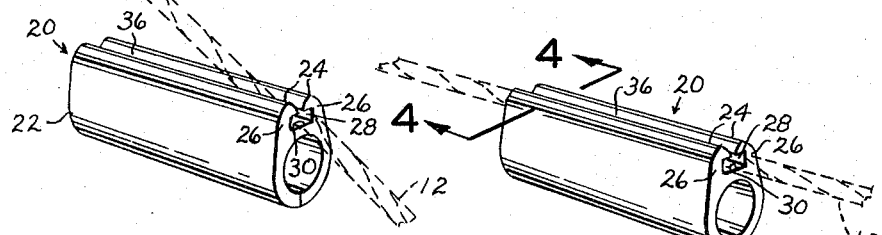
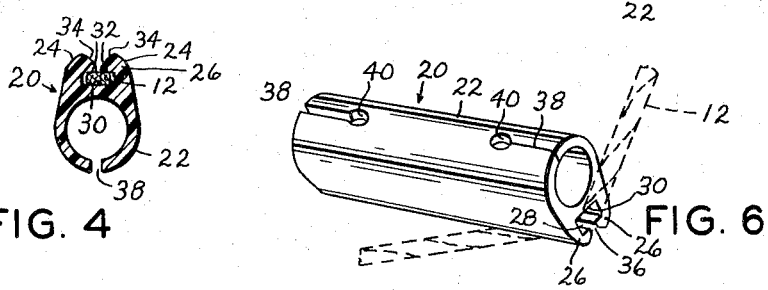
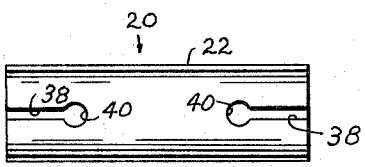
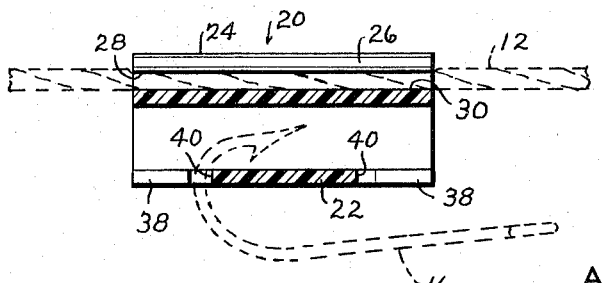
ARTHUR J. MULLIKIN
*INVENTOR.*
BY
*Robert K. Rhea*
AGENT

United States Patent Office 3,295,245
Patented Jan. 3, 1967

3,295,245
FISHHOOK GUARD AND LEADER
ALIGNING DEVICE
Arthur J. Mullikin, 610 Cravens Bldg.,
Oklahoma City, Okla. 73101
Filed Feb. 19, 1965, Ser. No. 434,070
2 Claims. (Cl. 43—57.5)

The present invention is a continuation-in-part of an application filed by me in the United States Patent Office on October 12, 1964, Serial No. 403,117 for Fishhook Guard and Leader Aligning device.

The present invention relates to angling and more particularly to a fishhook guard.

It is desirable when fishing with a trotline that some means be provided for guarding or "disarming" the barbs of the plurality of fishhooks attached by a like plurality of leaders to the trotline so that the user will not be injured by the barbs of the fishhook when setting or stringing the trotline and when reeling in the trotline. It is also desirable that a means be provided for aligning the leaders and fishhooks parallel to and adjacent the trotline when winding up or unwinding the trotline so that the trotline, leaders and fishhooks do not become entangled.

It is, therefore, the principal object of this invention to provide a guard, which supported by the fishing line, removably receives and nests the barbed portion of fishhooks thereon.

A similarly important object is to provide a fishhook guard which is frictionally adjustable longitudinally of the fishing line so that the leader, attaching the fishhook to the fishing line, will be aligned with the latter when the guard is in fishhook barb disarming position.

Another object is to provide a fishhook guard which does not materially add to the weight and bulkiness of a trotline when wound on a holder or reel.

Another object is to provide a fishhook guard for trotlines, or the like, which permits the trotline to be wound on or unwound from a holder substantially as easily as winding and unwinding a single fishing line.

A still further object is to provide a trotline fishhook guard having a longitudinal slot for removably receiving a plurality of sizes of trotlines.

The present invention accomplishes these and other objects by forming a tube-like fishhook guard of plastic material having means at each end for frictional engagement with the fishhook shank and shielding the barb of the fishhook. Means along one side of the guard frictionally engages a trotline.

Other objects will be apparent from the following description when taken in conjunction with the accompanying single sheet of drawings, wherein:

FIGURE 1 is a side view of a fragment of a trotline illustrating the guard in fishhook shielding and leader aligning position;

FIGURE 2 is a perspective view, to a different scale, of the guard and a fragment of the trotline illustrating the manner in which the trotline is positioned for attachment with the guard;

FIGURE 3 is a view similar to FIG. 2 illustrating a fragment of the trotline when nested by the guard;

FIGURE 4 is a vertical cross-sectional view taken substantially along the line 4—4 of FIG. 2;

FIGURE 5 is an elevational view of the side of the guard opposite the trotline engaging portion showing the fishhook holding recesses;

FIGURE 6 is a perspective view of the guard and a fragment of trotline as seen from the end of the guard when positioned oppositely to FIG. 2; and, FIGURE 7 is a longitudinal cross-sectional view of the guard in trotline and fishhook receiving position.

Like characters of reference designate like parts in those figures of the drawings in which they occur.

In the drawings:

The reference numeral 10 indicates a trotline, as a whole, comprising a main line or cord 12 having a plurality of leaders 14 attached thereto, each leader 14 being provided with a fishhook 16. Obviously the leaders 14 may be provided with swivels, not shown, for connection with the line 12 between line clamps 18, if desired, or the leader may be tied to the line 12.

Referring more particularly to FIGS. 2 through 7, the numeral 20 indicates a guard or shield, as a whole, comprising a relatively short section of casing-like body or tube 22, preferably circular in cross section, but other cross sectional shapes may be used if desired. One longitudinal side of the tube is extended to form a laterally projecting extension 24 tangential at its outer surfaces with respect ot the outer surface of the tube 22 characterized by a pair of oppositely positioned leg members 26 when viewed in cross section (FIG. 4). Cross-sectionally the material forming the leg members is substantially thicker than the wall of the tube-like portion 22. The inner surfaces of the leg members 26 are substantially inverted L-shaped, as shown in FIGS. 2 and 4, and form a substantially rectangular, when viewed in cross section, opening or socket 28 in cooperation with a surface 30 positioned in opposing relation with respect to the foot portions 32 of the leg members. The outer surfaces of each foot portion are arcuately curved inwardly of the lateral extension 24, as at 34, toward the inner surface of the foot portion 32 of the respective leg so that the curved surfaces 34 of the legs form a substantially inverted V-shape and form an indentation or groove-like recess 36 longitudinally of the extension 24. The respective end portions of the tube portion 22 opposite the extension 24 are slotted a selected distance longitudinally of the tube, as at 38, with each slot terminating in a substantially circular opening 40 of greater diameter than the the width of the slot. The width of the slots 38 with respect to the fishhooks 16 is such that they frictionally receive and resiliently admit the curved portion of the shank of the fishhook 16 so that the opening 40 substantially surrounds a portion of the fishhook shank when positioned therein with the barbed portion of the fishhook completely surrounded by the inner wall of the guard tube 22. The length and size of the device may be varied as desired for the reception of trotlines and fishhooks wherein the size of the extension 24 and the opening 28 will vary in accordance with the size of the line 12 to be used with the guard 20. Similarly the length and width of the fishhook receiving slots 38 and openings 40 are other variables. The limits of the variables are governed by a desired action of the device in operation as disclosed hereinbelow.

*Operation*

In operation a conventional trotline 10 is provided having leaders 14 and attached fishhooks 16. Diametrically the line 12 is at least equal and preferably greater than the distance between the surface 30 and the inner surface of the foot portions 32 of the legs. The guard 20 is connected to the main line 12 by manually grasping the guard and a portion of the line 12 with the line overlying the indentation or longitudinal recess 36. The other hand of the user grasps a portion of the line 12, projecting beyond one end of the guard, and pulls the line downwardly toward the open end of the line receiving slot 28 and toward the adjacent open end of the tube portion 22. This action causes a spreading apart of the foot portions 32 of the leg members 26 pivoting the respective sides of the device about the web portion defined by the bore of the tube and the inner surface 30 wherein the side wall of the tube springs inwardly to close the spacing formed by the slot 38 (FIG. 6). The line 12 may then be pulled into the opening 28 in a sliding action by moving the guard longitudinally of the line while holding a tension on the latter in contact with the arcuate surfaces forming the recess 36 opposite the end portion of the guard positioned on the line. The leg members 26 thus form a line clamp throughout the entire length of the guard. The material of the guard forming the legs 26 will not permit positioning the guard on the line except in the manner disclosed hereinabove for the reason that the central portion of the guard, between the openings 40, cannot spring inwardly or pivot about the web portion to admit the line. When the guard is positioned on the line 12, the material of the guard forming the legs 26 tends to force the foot portions 32 of the legs toward each other thus clamping the line 12 and in most instances deforming the line to substantially conform to the rectangular configuration of the line receiving opening 28. The guard 20 may then be moved in a sliding action longitudinally of the line to a desired position with respect to the fishhook and leader. The guard 20 may be removed from the line 12 by manually pulling it out of one end portion of the opening 28 by holding the guard and pulling the line out from between the legs 26.

The fishhook is positioned within the guard 20 at that end portion along the line 12 opposite the connection of the leader with the line wherein the barbed portion of the hook is inserted into the bore of the tube portion 22 so that the curved portion of the fishhook shank contacts the open end of the adjacent slot 38. The fishhook is manually pulled through the slot 38 until the shank is positioned within the opening 40. The circular configuration of the opening 40 substantially surrounding a portion of the fishhook shank thus forms a lock and guard for the fishhook to disarm the latter when not in use while simultaneously aligning the fishhook and leader with the line 12. When the remaining fishhooks of the trotline are thus positioned within respective guards the trotline may be easily wound on a reel or the like.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A fishhook guard and holder for a trotline having a leader and a fishhook attached thereto, comprising: an elongated body, said body having a fishhook barb nesting bore extending therethrough adjacent one of its sides, the other side of said body having a coextensive longitudinally divided lateral projection having opposing arcuate surfaces forming a relatively narrow trotline receiving groove, said lateral projection having a coextensive trotline surrounding and gripping opening in communication with the groove, the trotline gripping opening being rectangular in cross section and having a shorter dimension less than the diameter of a trotline to be received therein, one end portion of the wall of said body having a slot therein diametrically opposite said divided lateral projection and extending longitudinally of the body a distance no greater than the diameter of its bore, said slot terminating in a circular opening diametrically greater than the width of the slot, the spacing between the walls of said body forming the slot being sufficiently narrow to frictionally and resiliently permit a sliding passage of a portion of a fishhook shank when pulled longitudinally of the slot and sufficiently wide to close by the flexing apart, in a spring like action, of said divided lateral projection when a portion of a trotline is pulled laterally through the groove into the trotline receiving opening.

2. A fishhook guard and leader aligning device for a trotline having at least one leader and a hook attached thereto, comprising: an elongated body having a length at least as great as the distance between the barb of a fishhook and the outer surface of the arc of the curved portion of the shank thereof, said body having a generally circular side and having a longitudinal bore open at both ends of the body forming a tube-like wall portion of said body, the diameter of the longitudinal bore being greater than the barbed portion of a fishhook to be received therein, the other side of said body having a coextensive web portion defined by a flat surface in parallel spaced relation with respect to the longitudinal bore and having a coextensive longitudinally divided lateral projection projecting outwardly of the flat surface and forming leg members, said leg members having inner L-shaped surfaces with the foot portions of the L-shaped surfaces projecting toward each other and terminating in closely spaced-apart relation and forming, in cooperation with said flat surface, a trotline nesting and gripping opening, the outer surfaces of the foot portions of said leg members having cooperating arcuate outer surfaces curved inwardly toward the trotline receiving and gripping opening to form a longitudinal trotline admitting groove, the end portions of the wall of said body opposite said divided lateral projection having a fishhook shank admitting slot extending longitudinally of the body a distance substantially equal to the diameter of the body bore and terminating in a circular opening diametrically greater than the width of the slot, whereby when a portion of a trotline is manually forced between the foot portions at one end of said divided lateral projection said leg members are fulcrumed about said web in a pivoting action by the meeting of the surfaces of the body forming the slot in said body wall.

References Cited by the Examiner

UNITED STATES PATENTS 2,762,155  9/1956  Cothern _____ 43—43.15 X
3,066,372  12/1962  Parker _____ 43—44.83 X

FOREIGN PATENTS 688,260  3/1953  Great Britain.

SAMUEL KOREN, *Primary Examiner.*

D. J. LEACH, *Assistant Examiner.*